United States Patent Office 3,235,273
Patented Feb. 15, 1966

3,235,273
RELATIVELY ROTATABLE SEAL ASSEMBLY HAVING ECCENTRIC SEALING CONTACT
Ludwik S. Bialkowski, Troy, Ohio, assignor to The B. F. Goodrich Company, New York, N.Y., a corporation of New York
Filed Aug. 23, 1962, Ser. No. 219,035
4 Claims. (Cl. 277—88)

This invention relates to fluid pressure seals useful in hydraulic equipment between relatively rotating parts. The seals of this invention are of the class in which two relatively rotatable sealing members have coplanar mating sealing faces and the sealing members are urged axially toward each other to engage such sealing faces. Seals of this class are sometimes called "rotary seals" or "sliding-contact packings" in the literature of this art.

The seals of this invention are designed on the principle that effective sealing is obtained if the unit load at the interface of the mating sealing faces is maintained at least as great or greater than the unit pressure of the fluid medium acting on the sealing members. To maximize the unit load at the interface with the available axial force, the sealing face of one of the sealing members of these assemblies is characterized by one or more very narrow annular sealing edges which are sometimes referred to in this specification as "knife" edges.

The knife-like sealing edge of one sealing member engages a plane radially continuous sealing face on the other sealing member. A feature of this invention is that the sealing members are arranged so that the interface of the knife sealing edge and the plane sealing face is eccentric of the rotational axis of the rotatable sealing member. Accordingly, as the parts are rotated, the knife sealing edge sweeps an appreciable area of the plane sealing surface to avoid concentrating wear on the plane sealing surface. Moreover this action also minimizes entrapment of particles of foreign matter under the sealing edge which could score or damage the sealing members.

The sealing member having said knife-like sealing edge may take a variety of different forms as described herein. In any case such sealing member is provided with means for maintaining the sealing ring and the plane sealing face in biased engagement with each other to provide the desired unit load at the interface. The biasing force may be obtained by suitable springs, by the resilience of the material of the sealing members, by the use of fluid pressure acting on the seal, or by various combinations of these mechanisms.

A preferred form of sealing member for use with a plane opposing sealing face includes a rigid annular body having an annular sealing diaphragm terminating in a thick annular margin on which the knife-like sealing edge is formed. The diaphragm is integral with the annular body and is attached to the body along an annular zone of the diaphragm which is substantially thinner than the margin on which the sealing edge is formed. Accordingly the diaphragm is adapted for annular resilient deflection axially relative to the body. With this form of sealing member, the diaphragm is preferably arranged so that fluid pressure of the system acts to deflect the diaphragm axially toward the opposing plane sealing face and thereby increase the unit load on the edge portion. The sealing diaphragm may be shaped relative to the body on which it is mounted so that the fluid pressure force can act either to augment or to reduce the sealing pressure, depending on the design configuration selected.

Certain preferred sealing assemblies embodying this invention are shown in the accompanying drawings as examples of how this invention may be practiced.

Figure 1:
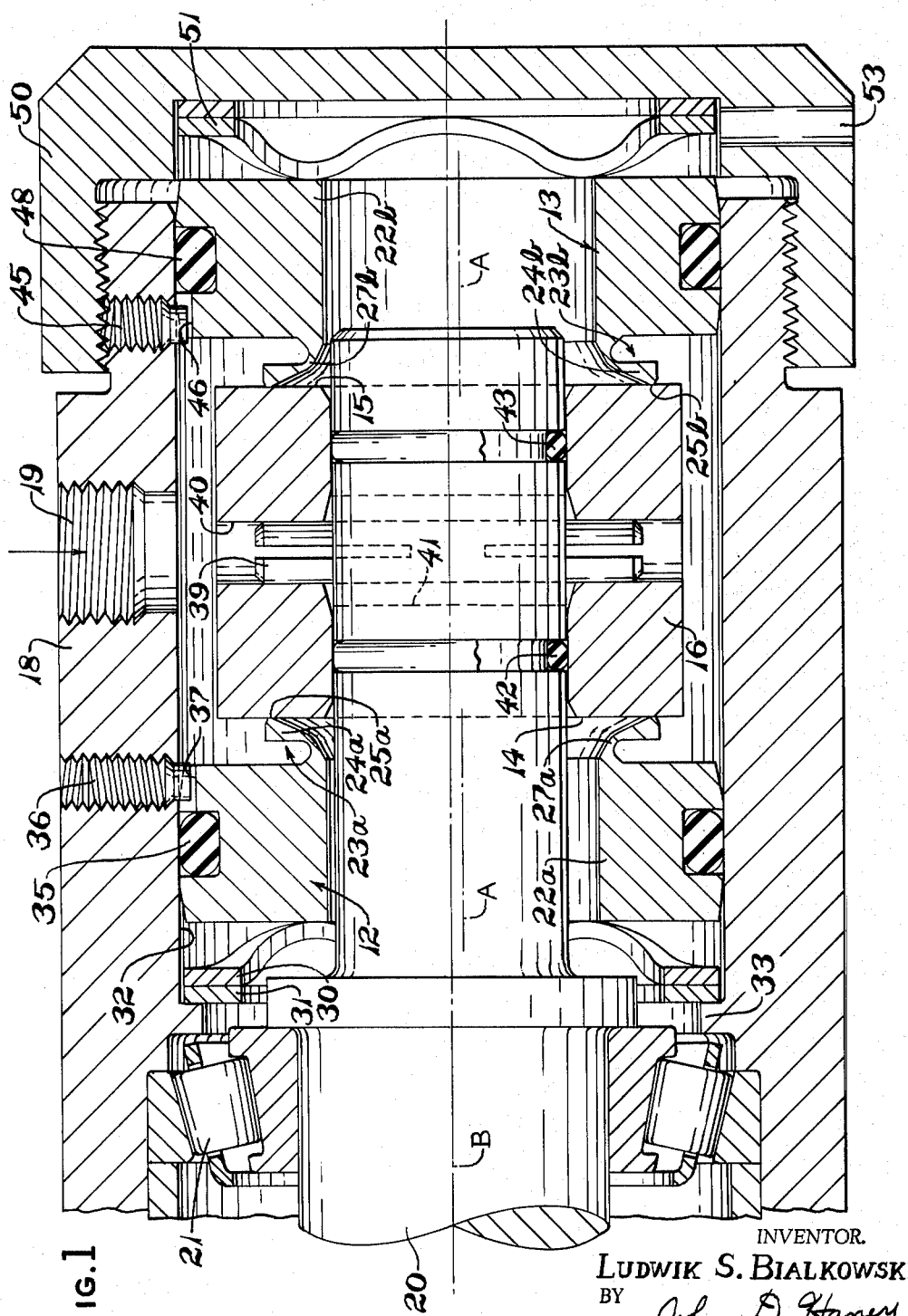
FIG. 1 shows an axial cross section of one form of seal assembly.

Referring to FIG. 1, a double rotary seal assembly is provided consisting of two sealing rings 12, 13 which sealingly engage opposing radial seal faces 14, 15, respectively, of a cylindrical member 16. The sealing rings 12 and 13 are mounted in a housing 18 adapted to receive fluid pressure through a port 19. The cylindrical sealing member 16 is engaged for rotation with a shaft 20 adapted to rotate relative to the housing 18 on bearings 21.

The sealing ring 12 and sealing ring 13 are identical in shape and function, and each includes a rigid annular ring-like body 22a, 22b having a sealing diaphragm 23a, 23b integral therewith. The sealing diaphragm has an outer thick marginal region 24a, 24b on which is formed a continuous sealing edge 25a, 25b. Each sealing edge is preferably shaped in the form of a plane annulus, the radial dimension of which is only several thousandths of an inch (e.g. 0.005 inch). This edge may be rounded, however, or it may be quite sharp, all these forms being included under the general terms "knife" edge or "line contact" edge sometimes used in this description.

Each sealing diaphragm 23a, 23b is connected to its respective body ring at an annular resilient flexible zone 27a, 27b which is very much thinner than the outer marginal regions 24a, 24b. The sealing diaphragms are axially deflectable relative to the body portion along the zones 27a, 27b.

The thick marginal regions 24a, 24b on which the sealing edges 25a, 25b are formed advantageously add strength for the reinforcing edges when the sealing diaphragm is subjected to axial deflection. Also these marginal regions serve as a "heat sink" in that, compared to the sealing edges, they have a relatively large heat capacity and therefore tend to accumulate heat generated at the sealing edge. Those margins conduct heat rapidly away from the sealing edge to prevent this edge from overheating and burning.

In assembling the parts of the FIG. 1 construction, the shaft is first installed inside the shaft housing 18 in its bearing 21. Then an annular wave spring washer 30 together with a plane annular backup washer 31 is inserted around the shaft through the open end of the housing 18 (the right end of housing in FIG. 1). These latter pieces fit into a bore 32 inside the housing 18 against a shoulder 33 adjoining bearing 21. Bore 32 is concentric with the rotational axis of the shaft.

Next, the sealing ring 12 is inserted over shaft 20 through the open end of housing 18 and is slid along bore 32 until the sealing ring body 22a is seated against spring washer 30. The body 22a of ring 12 has a peripheral O-ring groove to receive an O-ring 35 which forms a static seal between the body and the bore 32. Although an elastomeric O-ring is shown in this assembly it is to be understood that the metal O-ring or any form of metallic static seal may be used in this location depending on the temperature and pressure conditions. The sealing ring 12 is retained in the bore 32 by a set screw 36 which is threaded through the wall of housing 18 and projects into an axial slot 37 in the periphery of the body 22a. The set screw prevents ring 12 from rotating in bore 32 but leaves the ring free for axial adjustment relative to bore 32. The sealing ring 12 is assembled with its sealing diaphragm 23a directed rightward toward the mouth of housing 18.

Next the cylindrical member 16 is fitted over the end of shaft 20 and adjusted to a position in which its radial sealing face 14 engages the sealing edge 25a of the diaphragm 23a on sealing ring 12. The cylindrical part 16 is then fastened to shaft 20 for rotation with it by means of a spring dowel pin 39 which is inserted through casing port 19 into a hole 40 of the cylinder 16 which registers with a hole 41 through shaft 20. The internal diameter of the cylindrical member 16 is in sealed engagement with the shaft 20 by O-rings 42, 43.

Next the sealing ring 13 is inserted over the end of shaft 20 with its sealing edge 25b directed toward and bearing against the radial sealing face 15 of the cylindrical member 16. Sealing ring 13 is prevented from rotating in bore 32 by a set screw 45 but the sealing ring is adapted for axial adjustment in the bore 32 by an axial slot 46 which the tip of set screw 45 engages. The sealing ring 13 also has a peripheral O-ring seal 48.

The entire assembly of spring 30, seal ring 12, cylinder member 16 and seal ring 13 is thereafter pressed together axially by a threaded end cap 50 which is screwed over the open end of the housing 18 and which includes inside it a wave spring washer 51 which bears against the body portion 22b of sealing ring 13. The cap 50 may include a suitable vent 53. As cap 50 is tightened the seal rings 12 and 13 and cylinder member 16 are shifted axially in the bore until both springs 30 and 51 are deflected so that these springs bias the seal rings against the cylinder member 16. Hole 41 is larger than pin 39 to permit slight axial adjustment of the cylinder member 16. Also tightening cap 50 deflects the diaphragms 24a, 24b of the seal rings to establish a very high unit load between the sealing edges 25a and 25b, and their respective plane sealing surfaces 14 and 15.

An important design feature of this assembly is that whereas the sealing faces 14 and 15 are concentric with and perpendicular to the rotary axis of the shaft 20, the sealing rings 12, 13 are made so that their sealing diaphragms 23a and 23b are eccentric relative to the outer diameter of their body portions. To illustrate this more clearly, FIG. 1 shows the diaphragm axis A offset from the rotational axis B of the shaft, the latter a distance between these axes being the degrees of eccentricity of the diaphragm. Accordingly when shaft 20 rotates the sealing edges 25a and 25b of the sealing rings 12 and 13, respectively, sweep a relatively large area of the surfaces 14 and 15.

In this assembly, fluid pressure may be introduced into the casing 18 through port 19. This pressure acts on the concave sides of each sealing diaphragm between the diaphragm and the body in a manner tending to deflect the diaphragms toward the respective sealing faces 14 and 15. As pressure increases, the unit load increases on the sealing edges 25a and 25b.

The wave springs 30 and 51 exert a continuing biasing force on their respective sealing rings 12 and 13 to insure that adequate sealing force exists at the sealing edge 25 even under very low pressure conditions.

Figure 2:
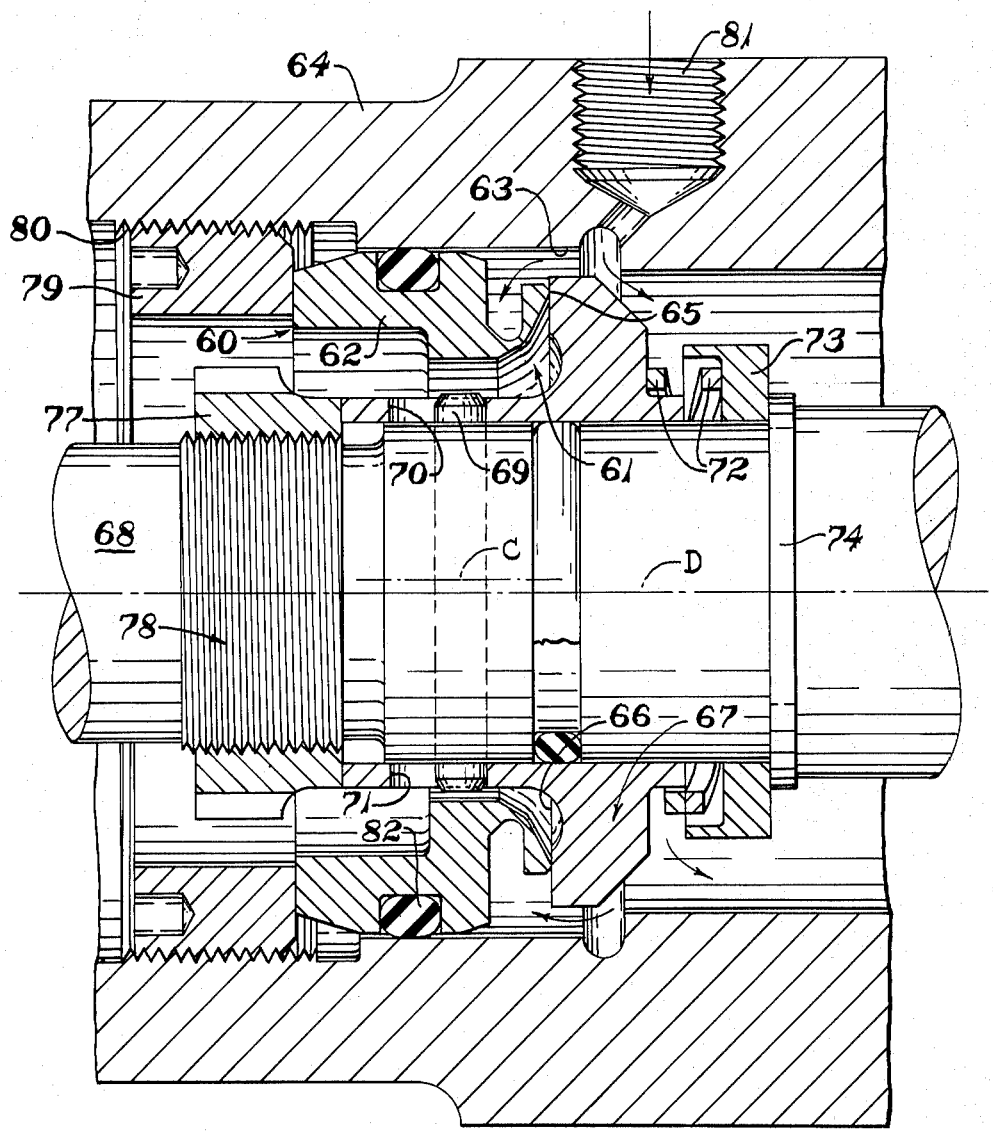
FIG. 2 shows an axial cross section of another preferred seal assembly embodying this invention.

Referring to FIG. 2, a sealing ring 60 has a sealing diaphragm 61 of identical configuration to the diaphragms described in FIG. 1. As shown, sealing ring 60 differs from the FIG. 1 forms only in the shape of its body portion 62. The sealing ring 60 fits into a bore 63 in a housing 64 with a narrow knife-like sealing edge 65 abutting a plane radial face 66 on a collar 67. The latter is keyed to a shaft 68 by a radial pin 69. Collar 67 rotates in locked engagement with shaft 68 through the pin 69 and is adapted for axial adjustment along the shaft 68 because of axial slots 70, 71 in the collar through which the opposite ends of key 69 project. Collar 67 is biased leftward by a pair of wave springs 72 retained in a collar 73 which bears against a shoulder 74 on the shaft 68. Collar 67 is urged against the springs 72 by a locking nut 77 which is threaded onto a thread 78 on the left end of the shaft 68 as it appears in FIG. 2.

The sealing ring 60 is pressed forceably rightward so that its annular diaphragm is axially deflected and its sealing edge 65 engages the radial face 66 of collar 67 by means of an adjusting nut 79 which is screwed into a thread 80 in the mouth of housing 64.

The diaphragm 61 of ring 60 is eccentric relative to the outer diameter of the body 62 of sealing ring 60 and therefore is also eccentric relative to the rotational axis of the shaft 68. The diaphragm axis is indicated in FIG. 2 by axis C and the shaft axis by D. Accordingly, when the shaft rotates, the sealing edge 65 sweeps an appreciably wider area of the plane sealing face 66 than the area instantaneously engaged by the sealing edge 65.

Fluid pressure may be introduced into casing 64 through port 81 to act against the back or concave side of the sealing diaphragm to urge it axially toward the collar 67. The arrows in FIG. 2 indicate the regions containing fluid pressure.

In the assembly of FIG. 2 the collar 67 together with its related parts 72, 73 are preferably installed before insertion of shaft 68 in the housing 64. The sealing ring 60 is fastened inside the housing by the locking nut 79 and is preferably sealed by a suitable O-ring 82.

Any of the forms of seals shown herein may be used with other forms of static seals instead of various forms of O-rings shown. Many combinations of mechanical seals may be designed embodying the principles described and claimed herein.

I claim:

1. A seal assembly comprising a housing, and two parts mounted in the housing for relative rotation concentrically on a common axis, the two parts being a first part having a plane radially continuous sealing face disposed normal to said axis, and a second part having a rigid metal ring-like body portion mounted for axial slidable movement relative to said first part, said body portion having a rigid metal annular sealing diaphragm axial of said body which diaphragm is joined integrally with said ring-like body along a thin annular flexible resilient zone and which diaphragm terminates in an integral annular margin remote from and thicker than said resilient zone, a substantially continuous annular line contact sealing edge on said margin located eccentrically of said body portion and said common axis for abutting sealing engagement with said plane sealing face, a spring for biasing the body portion of said second part and said first part axially toward each other and a loading nut engaged with the housing for forcibly deflecting said spring and for urging said two parts relatively toward each other to deflect said zone of said diaphragm resiliently and thereby maintain resilient pressure engagement at the interface of said sealing edge and said plane sealing face.

2. A seal assembly according to claim 1 wherein said resilient zone of said diaphragm is of smaller diameter than said annular margin and said sealing edge thereon.

3. A sealing assembly according to claim 2 wherein said sealing diaphragm is oriented with respect to fluid pressure acting thereon so that the pressure acts to urge said diaphragm axially toward said plane sealing face of said first member.

4. A seal assembly according to claim 1 wherein said first part having said plane sealing face is also mounted for slidable axial movement relative to said second part.

References Cited by the Examiner

UNITED STATES PATENTS

| | | | |
|---|---|---|---|
| 2,189,197 | 2/1940 | Cerny | 277—42 |
| 2,645,507 | 7/1953 | Isenbarger | 277—40 |
| 2,668,068 | 2/1954 | Bredemeier | 277—85 |
| 3,031,198 | 4/1962 | Hudson | 277—96 X |
| 3,079,605 | 2/1963 | Thomas et al. | 277—59 X |

FOREIGN PATENTS

| | | |
|---|---|---|
| 1,061,144 | 7/1959 | Germany. |
| 1,098,305 | 1/1961 | Germany. |

SAMUEL ROTHBERG, Primary Examiner.

S. B. ROTHBERG, LEWIS J. LENNY, Examiners.